United States Patent [19]

Saito

[11] Patent Number: 5,447,682
[45] Date of Patent: Sep. 5, 1995

[54] METHOD FOR PRODUCTION OF MAGNETIC COATING MATERIAL

[75] Inventor: Yusuki Saito, Yamato, Japan

[73] Assignee: Minnesota Mining and Manufacturing Company, St. Paul, Minn.

[21] Appl. No.: 82,233

[22] Filed: Jun. 24, 1993

[30] Foreign Application Priority Data

Jul. 6, 1992 [JP] Japan .................................. 4-178105

[51] Int. Cl.$^6$ .............................................. B22F 1/00
[52] U.S. Cl. ........................................ 419/66; 419/61; 419/62; 419/64; 419/65
[58] Field of Search ............... 419/61, 62, 64–66; 428/323, 327, 328, 403, 425.9, 694

[56] References Cited

U.S. PATENT DOCUMENTS

| | | | |
|---|---|---|---|
| 4,511,484 | 4/1985 | Anonuma et al. | 252/62.54 |
| 4,789,591 | 12/1988 | Nakamura et al. | 428/328 |
| 4,980,199 | 12/1990 | Okita et al. | 427/128 |
| 5,079,085 | 1/1992 | Hashimoto et al. | 428/327 |
| 5,094,916 | 3/1992 | Sasaki et al. | 428/425.9 |
| 5,139,865 | 8/1992 | Inaba et al. | 428/323 |
| 5,153,079 | 10/1992 | Sasaki et al. | 428/694 |
| 5,244,736 | 9/1993 | Hashimoto et al. | 428/403 |

FOREIGN PATENT DOCUMENTS

2-178363 12/1963 Japan .
1450241 9/1976 United Kingdom .

*Primary Examiner*—Donald P. Walsh
*Assistant Examiner*—John N. Greaves
*Attorney, Agent, or Firm*—Gary L. Griswold; Walter N. Kirn; David B. Kagan

[57] ABSTRACT

According to the method of making a magnetic coating material, 100 parts by weight of a magnetic metal powder, 1 to 10 parts by weight of fatty acid, 1 to 5 parts by weight of a dispersing agent, and a solvent are combined in the absence of a binding agent, wherein the solvent is present in sufficient amount to yield an admixture having a solids concentration of the magnetic metal powder in the range from 65 to 70 percent. The admixture is kneaded using a pressure kneader. The kneaded admixture is then blended with a binding agent to provide the magnetic coating material.

4 Claims, 1 Drawing Sheet

//  5,447,682

METHOD FOR PRODUCTION OF MAGNETIC COATING MATERIAL

FIELD OF THE INVENTION

This invention relates to a method for the production of a magnetic coating material. More particularly, this invention relates to a method of making a magnetic coating material that disperses a magnetic metal powder of an extremely small particle size to a high degree, and minimizes any alteration of a binding agent used in said coating material.

BACKGROUND OF THE INVENTION

In recent years, the trend of magnetic recording media to incorporate smaller-sized magnetic particles at higher densities has increased the necessity of improving the dispersion of such particles, such as magnetic iron oxide, magnetic metal, or magnetic barium ferrite, to a high degree in a binding agent and enabling the resultant magnetic particles to be oriented to a high degree in the produced magnetic recording medium. Such fine magnetic powder actually used as a raw material typically has a BET specific surface area of not less than 55 $m^2/g$. Magnetic raw material having a BET value of this order contains particles having small particle diameters such as, for example, from about 0.1 micron to about 0.02 microns, and this magnetic raw material exhibits a strong cohesive force compared with a magnetic raw material having a smaller BET value.

Japanese Unexamined Patent Publication No. JP02-178363 proposes a method for the production of a magnetic coating material that comprises blending a magnetic powder with a binding agent, an organic solvent, etc. in a ratio calculated to yield a solids concentration in the range between 65 and 95% by weight by using one twin-shaft type continuous kneading device provided with a pair of vaned shafts and a barrel for rotatably accommodating the shafts therein. This method is purportedly capable of producing a magnetic coating material having a magnetic powder packed and dispersed to a high degree therein. Since this method utilizes an ordinary continuous process kneader, the kneading of the magnetic raw material necessarily occurs in the presence of a binding agent.

When this method is executed with a granular magnetic metal raw material having a BET value of about 55 $m^2/g$, the kneading force is insufficient to effectively disperse the magnetic metal raw material. The resultant magnetic coatings show inferior magnetic properties. Further, kneading the magnetic metal raw material in the presence of the binding agent also may generate sufficient heat to alter, e.g., plasticize, the binding agent. When the magnetic coating material is diluted to a suitable degree of viscosity to allow kneading, since the dilution inevitably requires shearing force exertion, there is also the possibility that kneading the diluted solution in the presence of the binding agent may also cause alteration of the binding agent.

SUMMARY OF THE INVENTION

According to the conventional techniques, kneading a granular magnetic metal raw material of a very small particle size in the presence of a binding agent fails to manifest a strong kneading force on the magnetic raw material because of the inevitable inclusion therein of the macromolecular substance. Accordingly, the first object of this invention is to provide the magnetic raw material with thorough kneading by overcoming the aforementioned drawback of the conventional method.

The second object of this invention, in connection with the fact that the Joule heat generated during the action of kneading is very intense when the magnetic raw material has an extremely small particle size and consequently affects the thermal hysteresis of raw materials such as, for example, the binding agent, is to repress the generation of this Joule heat.

The third object of this invention is to give the magnetic powder, as a raw material, a chance to adsorb a fatty acid and/or dispersing agent in the absence of the binding agent and accomplish the final goal of lowering the viscosity of the produced coating material. When the magnetic raw material happens to be in the form of a fine powder, since it has a large surface area, it is indispensably necessary that the magnetic powder adsorb the fatty acid uniformly.

The fourth object of this invention, in connection with the dilution of the produced magnetic coating material to a suitable degree of viscosity, is further to enable the coating material to be diluted with the aid of agitation without using a shearing force.

According to the method of making a magnetic coating material of the present invention, 100 parts by weight of a magnetic metal powder, 1 to 10 parts by weight of fatty acid, 1 to 5 parts by weight of a dispersing agent, and a solvent are combined in the absence of a binding agent, wherein the solvent is present in sufficient amount to yield an admixture having a solids concentration of the magnetic metal powder in the range from 65 to 70 percent. The admixture is kneaded using a pressure kneader. The kneaded admixture is then blended with a binding agent to provide the magnetic coating material.

DETAILED DESCRIPTION OF THE INVENTION

Figure 1:
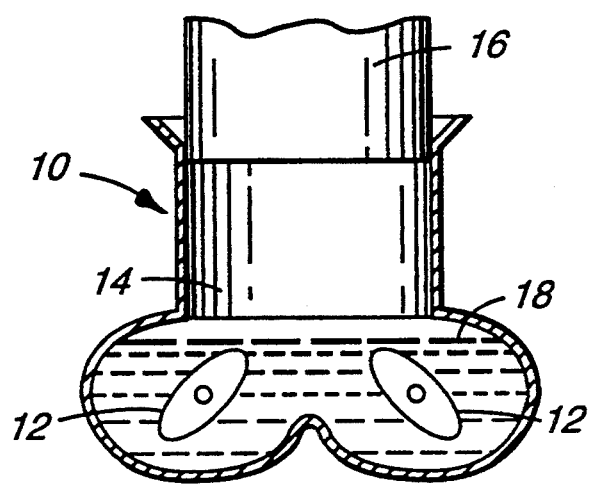
FIG. 1 is an illustration with parts cut away of a pressure kneader suitable in the practice of this invention.

The method for the production of a magnetic coating material contemplated by this invention is characterized by kneading a magnetic metal raw material of a very small particle size with a solvent, a fatty acid, and a dispersing agent, but in the absence of a binding agent. Referring now to FIG. 1, there is shown one example of a pressure kneader 10 found to be suitable in the practice of the present invention. The pressure kneader 10 is adapted to operate under application of pressure by a piston 16 and is provided with stirring members 12 disposed inside a kneading chamber 14. Allowed to fall down inside the kneading chamber 14, the piston 16 aids in the application of pressure to the contents 18 of the kneading chamber 14. The pressure kneader 10 is characterized in that the contents 18 being kneaded are allowed to flow within the kneading chamber 14 without escaping the action of kneading, the shearing force is exerted by virtue of steric hindrance, and voids in the kneading chamber 14 are prevented when the volume of the material is decreased as a result of the downward force of the piston 16 during the kneading process. A pressure kneader of Moriyama Seisakusho marketed under the model designation "PS03-3GHB-S" may be cited as one specific example of a commercially available pressure kneader suitable in the practice of the present invention. The solids concentration of the magnetic material during the kneading process is selected in the range between 65 and 70% with due respect to the ideal balance between the kneading force and the flowability of the magnetic material.

If the solids concentration of the magnetic material being kneaded exceeds 70%, the contents 18 of the kneader 10 may be kneaded only with difficulty because the contents 18 acquire unduly high viscosity and suffer from inferior flowability. Conversely, if the solids concentration falls short of 65%, the disadvantage ensues that the contents 18 acquire undue low viscosity and no ample shearing force can be exerted on the material being kneaded.

The method of this invention adopts the pressure kneader because the material being kneaded requires exertion thereto with a high shearing force. The ordinary open type kneader is incapable of fulfilling this requirement. The pressure kneader is further necessary because the magnetic powder should be thoroughly impregnated with a small amount of the solvent.

As the solvent to be used in this invention, cyclohexanone may be cited, for example, considering such factors as the solubility to be manifested by the fatty acid in the solvent and the boiling point of the solvent itself. The other solvents that are likewise usable and effective herein include toluene, methylisobutyl ketone, and methylethyl ketone, for example.

In the method of this invention, the contents of the pressure kneader avoid containing a binding agent for the following reasons. First, in the conventional process of kneading the material containing a binding agent, no strong kneading force is exerted onto the magnetic powder because the material being kneaded suffers from the presence of a macromolecular compound, i.e., the binding agent. When the magnetic material happens to be a granular magnetic metal material having a very small particle size, the step of kneading this material and the step of blending of the material with the binding agent must be carried out separately from each other. If these two steps are carried out at the same time, i.e., kneading occurs in the presence of the binding agent, then the kneading may fail to proceed completely, kneading may require excessive time, or the material being kneaded can possibly succumb to fatigue. Thus, the fatty acid with which the magnetic material is kneaded is required to be a low molecular compound. Second, the absence of a binding agent during kneading contributes to repression of the Joule heat generated during the process of kneading by virtue of the effect of slipping and, as a result, alleviating the thermal hysteresis of the binding agent. Third, the absence of a binding agent during kneading gives the magnetic powder a chance to adsorb the fatty acid and/or dispersing agent to a greater degree and enables the produced coating material to acquire a lowered viscosity.

The fatty acids that are effectively usable in the present invention include myristic acid, oleic acid, lauric acid, palmitic acid, stearic acid, and behenic acid, for example. These fatty acids may be used either singly or in the form of a mixture of two or more members. The amount of the fatty acid to be used herein is in the range between 1 to 10 parts by weight, based on 100 parts by weight of the magnetic powder.

This invention also incorporates a dispersing agent in the contents to be kneaded. This component is used to lower the viscosity of the coating material. The dispersing agents that can be used effectively herein include such fatty acids as those mentioned above, which have 12 to 18 carbon atoms; metallic soaps formed of alkali metals (Li, Na, and K, for example) and alkaline earth metals (Mg, Ca, and Ba, for example) of the fatty acids mentioned above; natural surfactants such as lecitin and cephalin; and synthetic surfactants possessing one or more of such polar groups as $-PO(OM)_2$, $-OPO(OM)_2$, $-SO_3M$, $-OSO_3M$, $-NR_2$, and $-NR_4X$ in the molecular unit thereof (wherein M stands for a hydrogen atom or a metal ion such as Li, Na, and K and R for a hydrogen atom or an alkyl group), for example. The amount of the dispersing agent to be used herein is in the range between 1 and 5 parts by weight, based on 100 parts by weight of the magnetic powder.

After kneading in the pressure kneader, the pasty mixture formed from kneading may then be combined with a binding agent, additional solvent, dispersing agent, etc. and then subjected to dispersion by using an ordinary sandmill, for example, to produce the magnetic coating material. The magnetic coating material thus obtained exhibits ideal dispersibility and, on being subjected to orientation in a magnetic field, acquires ideal magnetic properties.

Now, this invention will be described more specifically below with reference to a working example. The method of this invention is not limited to the example.

EXAMPLE

A solution containing 3.96 parts by weight of myristic acid, 2.62 parts by weight of dispersing agent, and 93.41 parts by weight of cyclohexanone was prepared in the kneading chamber of a pressure kneader.

Then, the solution in the kneading chamber and a fine magnetic metal powder having a BET value of 55.5 $m^2/g$ added thereto in a ratio of 66.45% by weight, based on the total amount of the resultant mixture, were subjected to kneading under application of pressure.

In a shaker type stirring device, 41.48 parts by weight of the pasty mixture obtained as described above was mixed with 2.2 parts by weight of polyurethane resin having a sodium sulfonate group, 2.2 parts by weight of vinyl resin (produced by the Japan Geon and marketed under product designation "MR-120"), 2.2 parts by weight of aluminum oxide (produced by Sumitomo Chemical Col, Ltd. and marketed under product code of "Hit-50"), 39.0 parts by weight of methylethyl ketone, and 12.91 parts by weight of toluene. The resultant mixture was subjected to a treatment of dispersion by using a batchwise sand grinder, to obtain a magnetic coating material. This magnetic coating material was applied to a PET substrate 33 $\mu m$ in thickness and then subjected to a treatment of orientation.

Comparative Example

A magnetic coating material was produced by following the procedure of the example cited above, except that the addition of the fatty acid and dispersing agent was omitted, the binding agent was used in the whole amount at once, and the solvent was partly used. The coat obtained in the previous example and that obtained in this comparative example were tested for surface gloss and Br/Bm, a magnitude indicative of orientation of magnetic particles dispersed in the coat, to evaluate the degree of dispersion. The results are shown in the following table.

TABLE 1

| | Surface Gloss | Br/Bm |
| --- | --- | --- |
| Working Example | 148 | .883 |
| Comparative Example | 127 | .848 |

What is claimed is:

1. A method of making a magnetic coating material, comprising the steps of:
   (a) in the absence of a binding agent, combining 100 parts by weight of a magnetic metal powder, 1 to 10 parts by weight of fatty acid, 1 to 5 parts by weight of a dispersing agent, and a solvent in sufficient amount to yield an admixture having a solids concentration of the magnetic metal powder in the range from 65 to 70 percent;
   (b) kneading the admixture using a pressure kneader; and
   (c) blending the kneaded admixture with a binding agent.

2. The method of claim 1, wherein the magnetic metal powder has a BET specific surface area of 55 $m^2/g$.

3. The method of claim 1, wherein the binding agent comprises a polyurethane and a vinyl resin.

4. The method of claim 1, wherein the solvent is cyclohexanone.

* * * * *

UNITED STATES PATENT AND TRADEMARK OFFICE
CERTIFICATE OF CORRECTION

PATENT NO. : 5,447,682
DATED : September 5, 1995
INVENTOR(S) : Saito

It is certified that error appears in the above-indentified patent and that said Letters Patent is hereby corrected as shown below:

Title page, item [75], inventor: should read--Yusuke--.

Title page, under Foreign Patent Documents, insert the following--

0101591  2/84  EPO
60025028  2/85  Japan

Signed and Sealed this

Ninth Day of April, 1996

Attest:

BRUCE LEHMAN

Attesting Officer    Commissioner of Patents and Trademarks